United States Patent [19]
Simpson et al.

[11] Patent Number: 5,203,172
[45] Date of Patent: Apr. 20, 1993

[54] ELECTROMAGNETICALLY POWERED HYDRAULIC ENGINE

[76] Inventors: Alvin B. Simpson, 437 W. Scott, Clovis, Calif. 93612; Charley W. Bisel, 286 E. 12th Ave., Broomfield, Colo. 80501

[21] Appl. No.: 836,523

[22] Filed: Feb. 18, 1992

Related U.S. Application Data

[63] Continuation-in-part of Ser. No. 740,091, Aug. 5, 1991, which is a continuation-in-part of Ser. No. 524,189, May 17, 1990, Pat. No. 5,036,930.

[51] Int. Cl.$^5$ ............... F15B 7/00; H02K 33/00; F04B 17/04
[52] U.S. Cl. ..................... 60/545; 180/305; 310/15; 310/24; 417/418
[58] Field of Search ........... 60/545, 325; 417/418; 310/15, 17, 22, 23, 24, 33; 180/305, 307

[56] References Cited

U.S. PATENT DOCUMENTS

| | | | |
|---|---|---|---|
| 280,247 | 6/1883 | See | 60/494 X |
| 581,204 | 4/1897 | Heftye | 417/418 |
| 1,804,376 | 5/1931 | Cobe | 417/418 |
| 3,740,171 | 6/1973 | Farkos | 417/418 |
| 3,754,154 | 8/1973 | Massie | 310/17 X |
| 4,240,515 | 12/1980 | Kirkwood | 60/413 X |
| 4,272,226 | 6/1981 | Osborne | 417/418 |
| 4,845,947 | 7/1989 | Persson et al. | 60/494 X |
| 5,048,295 | 9/1991 | Hoscheler | 60/494 X |
| 5,106,268 | 4/1992 | Kawamura et al. | 417/418 X |
| 5,106,274 | 4/1992 | Holtzapple | 417/418 X |

Primary Examiner—Edward K. Look
Assistant Examiner—John Ryznic
Attorney, Agent, or Firm—Victor Flores

[57] ABSTRACT

A hydraulic engine apparatus and method that converts pulsed electromagnetic energy into mechanical force and motion. The engine apparatus produces usable mechanical power by pumping action made possible by a reciprocating piston in a cylinder acting on a fluid that is responsive to the pulsed electromagnetic energy. The cylinder is provided with check-valved input and output ports at both ends of the cylinder, which output ports are hydraulically coupled to a hydraulic motor for delivering mechanical power from the hydraulic motor's output drive shaft. The piston has embedded permanent magnets that coact with the pulsating electromagnets to produce the reciprocating action. The piston permanent magnet has prodruding ends which are received within central bore portions of core members of the electromagnets for producing increased magnetic pull.

13 Claims, 3 Drawing Sheets

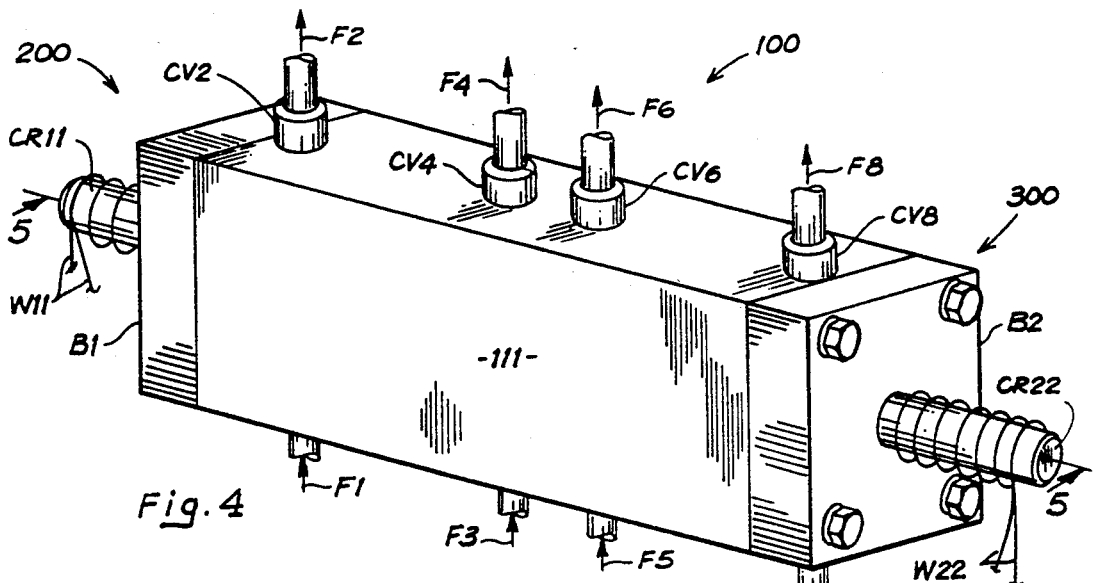
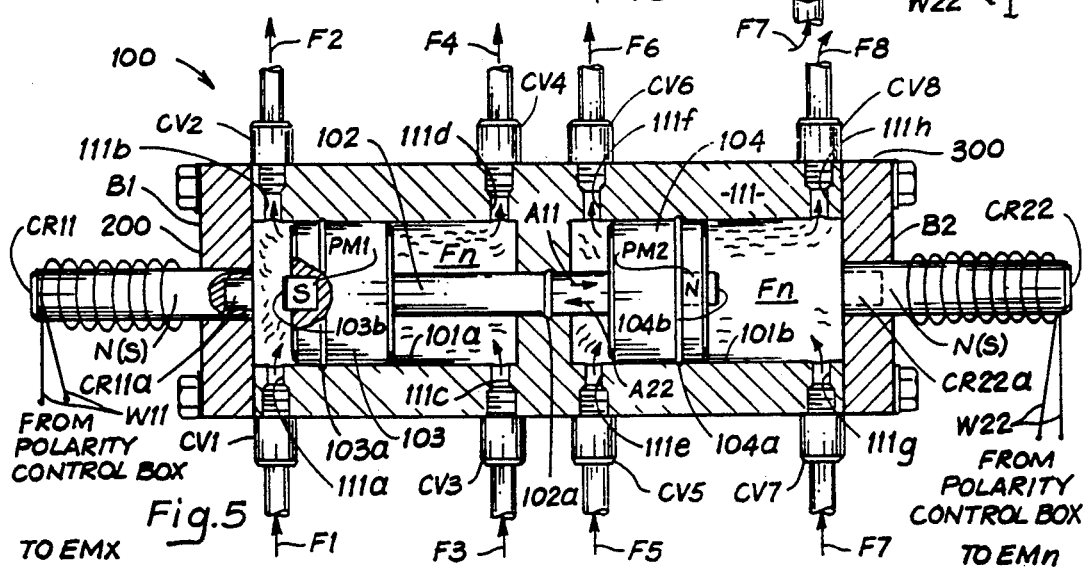
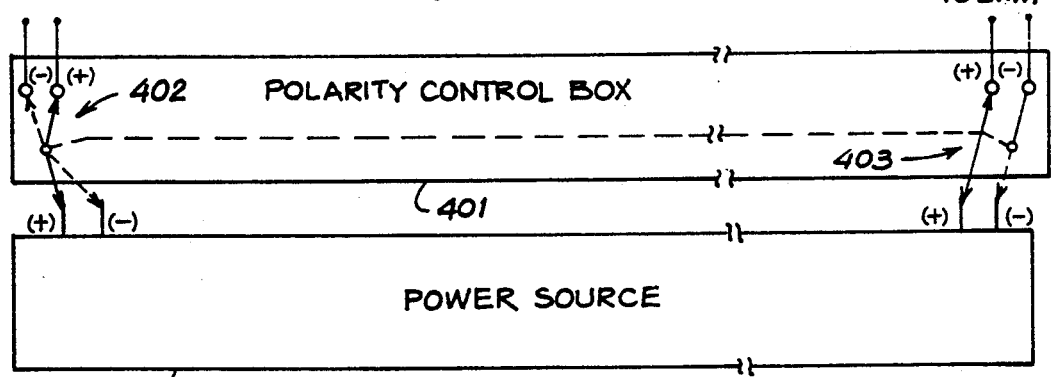

ELECTROMAGNETICALLY POWERED HYDRAULIC ENGINE

RELATED APPLICATIONS

This application is a continuation-in-part of U.S. patent application Ser. No. 07/740,091, filed on Aug. 5, 1991, which is a continuation-in-part of U.S. patent application Ser. No. 07/524,189, filed on May 17, 1990, now U.S. Pat. No. 5,036,930 issued on Aug. 6, 1991.

FIELD OF THE INVENTION

This invention relates to engine apparatus and methods for producing work at an output thereof. More particularly, the present invention relates to electrically powered engine apparatus and method of producing work at an output thereof. Even more particularly, the present invention relates to electromagnetically powered apparatus that produce work at an output thereof by means of combining electromagnet devices and hydraulic devices to produce work useful in propulsion of vehicles and other power input dependent apparatus.

DESCRIPTION OF THE PRIOR ART

The principles of work are considered well known to the artisan as they relate to rectilinear and rotary motion of an object, suffice it to say that it concerns the transference of energy produced by the motion of an object by application of a force and is measured by the product of the force and displacement of the object. The internal combustion engine is a known apparatus employed to perform work by cranking a crankshaft. The advantage to mankind in having the internal combustion engine, is without question, superior to other tools developed by man to manage the daily tasks of living, including the electric motor whose rotor equates to the crankshaft in performing work. The internal combustion engine has had much research attention and has been perfected to yield great satisfaction in work efficiency, torque and speed. But, while the advantages are recognized by all, the polluting disadvantages to the environment have been largely ignored to the detriment of society. Electric motors have replaced many machine application formerly relying on the internal combustion engines, and while they have also enjoyed much technological advances, they have not been perfected to the point of replacing the greatest source of pollution, namely the automobile engine, (see Wall Street Journal Article entitled: "GM Says It Plans an Electric Car, but Details Are Spotty", page B1, dated Thursday Apr. 19, 1990).

The internal combustion engine requires timely firing of a spark within a cylinder chamber having gone through a compression stroke to produce the power stroke that moves a piston/rod in a reciprocating manner to drive a crankshaft having a power output attachment. The end-use apparatus of the power output attachment are many, and include the automobile which has required many engine variations and cylinder block configurations to harness the energy produced at the crankshaft that results into propulsion of the automobile. The electric motors traditionally require large battery units to continually produce rotating drivetrain power, and as alluded to in the Wall Street article, have yet to be commercially attractive as an alternative engine technology.

Therefore, a need is seen to exist for an engine apparatus that maintains the attributes of an internal combustion engine, including high performance parameters such as horsepower ratings, speed and torque packaged in a small volume and that further includes the non-polluting attributes of an electric motor without the need for large storage battery units.

SUMMARY OF THE INVENTION

Accordingly, the primary object of the present invention is to provide an engine apparatus having high performance parameters, such as horsepower ratings, speed and torque without the disadvantages of an internal combustion engine, primarily pollution associated with the combustion of petroleum products.

Another object of the present invention is to provide an engine that operates clean similar to the electric motor but that is more efficient in the conversion of electrical energy to mechanical energy and that also utilizes petroleum products in a non-combustible manner.

A related object of the present invention is to provide a vehicular apparatus that utilizes an engine having the foregoing objects.

In the most basic embodiment, the present invention satisfies the foregoing objects by providing an engine apparatus that utilizes electrical energy to activate an opposing arrangement of electromagnets that controllably produce magnetic fields acting on a piston having an embedded permanent magnet to produce repeated compression strokes that act on a fluid within a cylinder to drive a hydraulic motor shaft. The electromagnet arrangement includes a dual-wire wound coil arrangement such that the piston with the permanent magnet is repeatedly repelled within the cylinder during alternating pulsed ON-OFF STATES of energization on each of the wire windings of the electromagnets to produce alternating polarities to effect delivery of pressurized fluid to the hydraulic motor. The repulsion force acting at one end of the piston is complemented by the attraction force acting at the opposite end of the piston, which repulsion and attraction forces are reversed at each end upon the occurrence of a change in polarity of the electromagnets.

Under controlled electrical, closed-loop primed hydraulic conditions, and during any given cycle of operation, consisting of a compression stroke and a return stroke of the piston, an input fluid is introduced at an input port corresponding to the chamber-end of the cylinder associated with the piston in a return stroke, concurrently an output fluid is delivered from an output port corresponding to the compression chamber-end of the cylinder associated with the piston in a compression stroke. The output fluid is delivered to and maintained at a high pressure by a pressure stabilizer to either, drive a hydraulic motor, or to be directed to a bypass valve for an idle state of operation, both the hydraulic motor and bypass valve being hydraulically coupled back to the input ports of the cylinder via a fluid reservoir. In a vehicular application, the hydraulic motor's drive shaft is coupled to the drivetrain of a vehicle to produce propulsion.

The underlying principles of the electromagnetically driven hydraulic pump facilitate the design of other engine configurations having at least one set of dual piston-permanent magnet means within a respective cylinder, each set of dual piston-permanent magnet means being interconnected by a common shaft to synchronize delivery of the pressurized fluid output to the hydraulic motor and being responsive to alternating polarity states on oppositely disposed electromagnets. The interconnecting common shaft region may be modified to increase operating pressure of the hydraulic engine by placement of a third electromagnet centrally in a given cylinder bank to complement the compression and return strokes produced by the end electromagnets.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating but three embodiment of the various ways in which the invention may be practiced.

BRIEF DESCRIPTION OF THE DRAWINGS

FIG. 4 is a perspective view of a second embodiment of the present invention showing a block arrangement having electromagnets at opposing ends and check-valved fluid input/output ports for being hydraulically coupled to other engine components shown generally in FIG. 3.

FIG. 5 is a cross-sectional view taken along line 5—5 in FIG. 4 of a second embodiment of the present invention, showing the dual piston-permanent magnet means within respective cylinder chambers and interconnected by a non-magnetic common shaft for synchronized operation and increased fluid throughput.

FIG. 5a illustrates a power source coupled to a magnetic polarity control box for changing the magnetic polarity of the electromagnets.

DESCRIPTION OF THE PREFERRED EMBODIMENT

Figure 1:
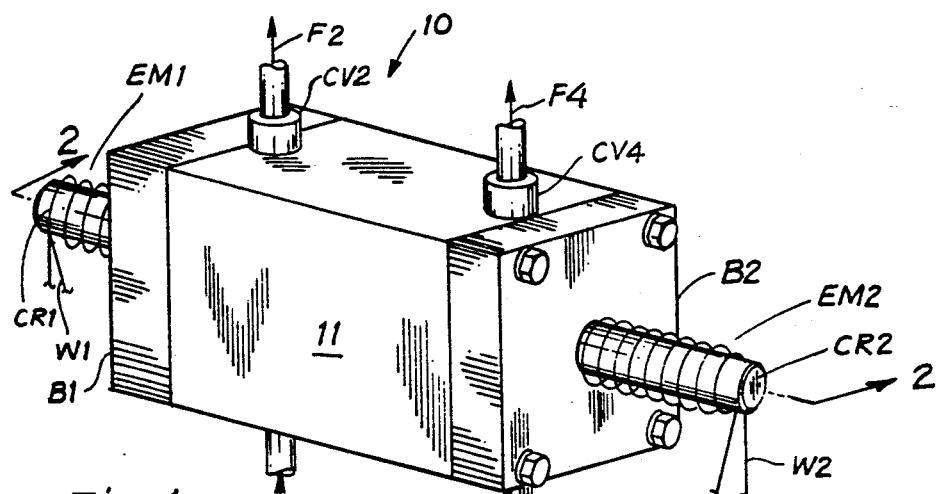
FIG. 1 is a perspective view of the present invention illustrating a basic embodiment comprising a block arrangement having a first and second electromagnetic means disposed at opposite ends and having check-valved fluid input and output ports.
Figure 2:
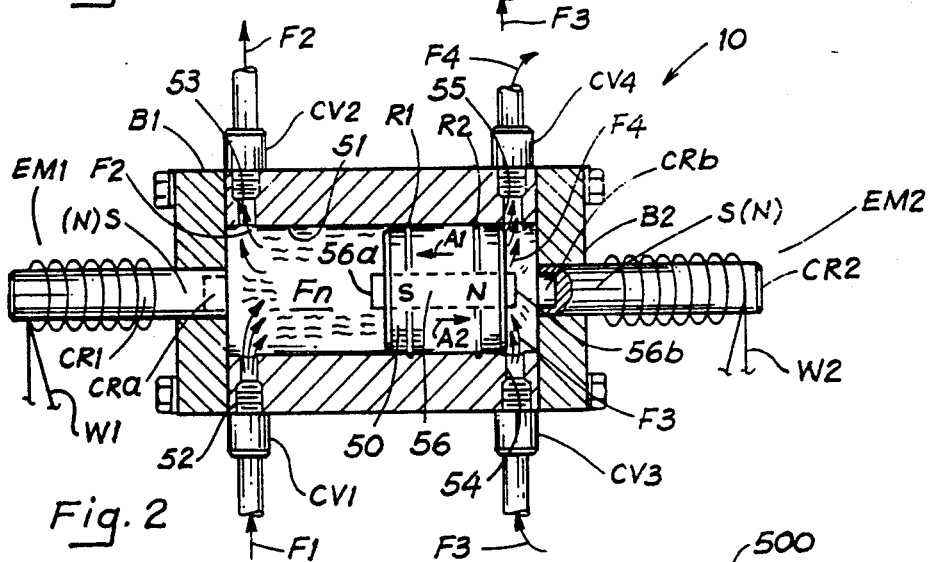
FIG. 2 is cross-sectional view taken along line 2—2 in FIG. 1 of a basic embodiment of the present invention, illustrating a single piston-permanent magnet means within a cylinder chamber and having its permanent north polarity end proximate a core member of a first electromagnet means which can be alternately polarized to repel or attract the piston-permanent magnet means and a second electromagnet means that complements the alternating repulsion or attraction polarity of the first electromagnet, and further illustrating the input/output flow of fluid according to the compression or return stroke state of the piston.

FIGS. 1 and 2 illustrate a basic embodiment 10 comprising a block arrangement 11, first and second electromagnetic means EM1 and EM2 disposed at opposite ends of block 11, and check-valved fluid input ports CV1, CV3 for controlling input fluid flow F1, F3 and output port CV2, CV4 for controlling fluid output flow F2, F4. Electromagnetic means EM1, EM2 each comprising a stationary, centrally disposed core member CR1, CR2, dual-winding coil members W1, W2 and mechanical interface ends B1, B2. As best seen in FIG. 2, basic embodiment 10 also comprises a single piston-permanent magnet means 50 disposed in a cylindrical chamber 51 of block 11, which block 11 is provided with ports 52, 53, 54 and 55 for the attachment of check valves CV1-CV4 which control the flow of fluid Fn, initially delivered into cylinder chamber 51 during a return stroke, as indicated by fluid flow arrows F1, F3, and which is expelled during a compression stroke, as indicated by fluid flow arrows F1, F3. Piston-permanent magnet means 50 is designed having rings R1, R2, for maintaining compression, and an embedded permanent magnet 56, which by example, is shown polarized south S and north N, and which is understood to be an arbitrary arrangement of the embedded permanent magnet. Any arrangement of the permanent magnet 56 is suitable so long as the polarity of the end electromagnets is synchronized to complement a repelling state at one end of the embedded permanent magnet with an attraction state at the other end of the permanent magnet.

Thus, as illustrated in FIG. 2 and assuming that piston 51 is to move in the direction of arrow A1, then electromagnet EM1 will be electrically energized to magnetically polarize core member CR1 to a north (N) polarity during the time associated with arrow A1, and concurrently, electromagnet EM2 will be energized to polarize core member CR2 to a south S polarity. Also, assuming that piston 50 has reached the end of stroke A1 to begin a return stroke, as indicated by motion arrow A2, then electromagnet EM1 will be electrically energized to polarize core member CR1 to a south S polarity during the time associated with motion arrow A2, and concurrently, electromagnet EM2 will be energized to polarize core member CR2 to a north (N) polarity. FIG. 2, shows permanent magnet 56 having protruding ends 56a, 56b, which are intended to be received within respective cavities CRa, CRb, and which are intended to increase the magnetic pull by the electromagnets, hence generation of higher fluid pressures. By design, cylinder chamber 51 is filled with fluid via either of the input ports/check valves (52/CV1) or (54/CV3) during a return stroke, depending which end of cylinder 51 is in a return stroke state that creates a vacuum that draw fluid from fluid reservoir 600, see FIG. 3. Similarly, cylinder 51 is emptied under compression via either of the output ports/check valves (53/CV2) or (55/CV4), also depending upon which side of cylinder 51 is under compression. Fluid Fn may be any petroleum fluid product, such as those commonly used in automatic transmissions.

FIGS. 4 and 5 illustrate a second embodiment 100 comprising a block arrangement 111, first and second electromagnetic means 200 and 300 disposed at opposite ends of block 111, and check-valved fluid input ports CV1, CV3, CV5 and CV7 for controlling input fluid flow F1, F3, F5, and F7 and output ports CV2, CV4, CV6, and CV8 for controlling fluid output flow F2, F4, F6, and F8. Electromagnetic means 200, 300 each comprising a stationary, centrally disposed core member CR11, CR22, dual-winding coil members W11, W22 and mechanical interface ends B1, B2. Electromagnetic means 200, 300 differ from electromagnets EM1, EM2 in their magnetic characteristics relating to attraction/-repulsion capabilities for reciprocating a dual piston configuration illustrated in FIG. 5. As best seen in FIG. 5, embodiment 100 also comprises a dual piston-permanent magnet means 103, 104 within respective cylinder chambers 101a, 101b, interconnected by a non-magnetic common shaft 102 used for synchronized operation and increased fluid throughput. Block 111 is provided with ports 111(a-h) for the attachment of check valves CV1–CV8 which control the flow of fluid Fn, initially delivered into cylinder chambers 101a, 101b during a return stroke, as indicated by fluid flow arrows F1, F3, F5, and F7, and which fluid Fn is expelled during a compression stroke, as indicated by fluid output flow arrows F2, F4, F6, and F8. Piston-permanent magnet means 103, 104 and interconnecting common shaft 102 are designed having rings 103a, 104a, 102a, respectively, for maintaining compression. Piston-permanent magnet means 103, 104 are each provided with an embedded permanent magnet PM1, PM2, which by example, are shown polarized south S and north N, respectively, at ends adjacent core members CR11, CR22, and which polarization is understood to be an arbitrary arrangement of the embedded permanent magnets. Any arrangement of the permanent magnets PM1, PM2 is suitable so long as the polarity at the inner ends of electromagnets 200, 300 is synchronized to repel one of the embedded permanent magnet and concurrently attract the other embedded permanent magnet. The non-magnetic interconnecting shaft 102 serves the mechanical function of maintaining synchronized reciprocating action of piston-permanent magnet means 103, 104.

Thus, as illustrated in FIG. 5 and assuming that pistons 103, 104 are to move in the direction of arrow A22, then electromagnet 200 will be electrically energized to magnetically polarize core member CR11 to a north N polarity at an inner end during the time associated with motion indicated by arrow A22, and concurrently, electromagnet 300 will be energized to polarize core member CR22 to a south N polarity also at an inner end. Also, assuming that pistons 103, 104 have reached the end of a compression stroke, as indicated by motion arrow A22, then the polarity of electromagnets 200, 300 will be reversed such that electromagnet 200 will be electrically energized to polarize core member CR11 to a south (S) polarity during the time associated with motion arrow A11, and concurrently, electromagnet 300 will be energized to polarize core member CR22 to a north (S) polarity. FIG. 5 also shows permanent magnets PM1, PM2 having protruding ends 103b, 104b which are intended to be received within respective cavities CR11a, CR22a, and which are intended to increase the magnetic pull by the electromagnets, hence generation of higher fluid pressures. By design, cylinder chambers 101a, 101b are filled with fluid via either of the input ports/check valves 111(a,e)/CV(1,5) or ports/check valves 111(c,g)/CV(3,7) during a return stroke, depending which end of cylinders 101a, 101b is in a return stroke state that creates a vacuum that draws fluid from fluid reservoir 600, see FIG. 3. Similarly, cylinders 101a, 101b are emptied under compression via either of the output ports/check valves 111(b,f)/CV(2,6) or 111(d,h)/CV(4,8), also depending upon which side of cylinders 101a, 101b is under compression. Fluid Fn may be any petroleum fluid product, such as those commonly used in automatic transmissions.

Figure 6:
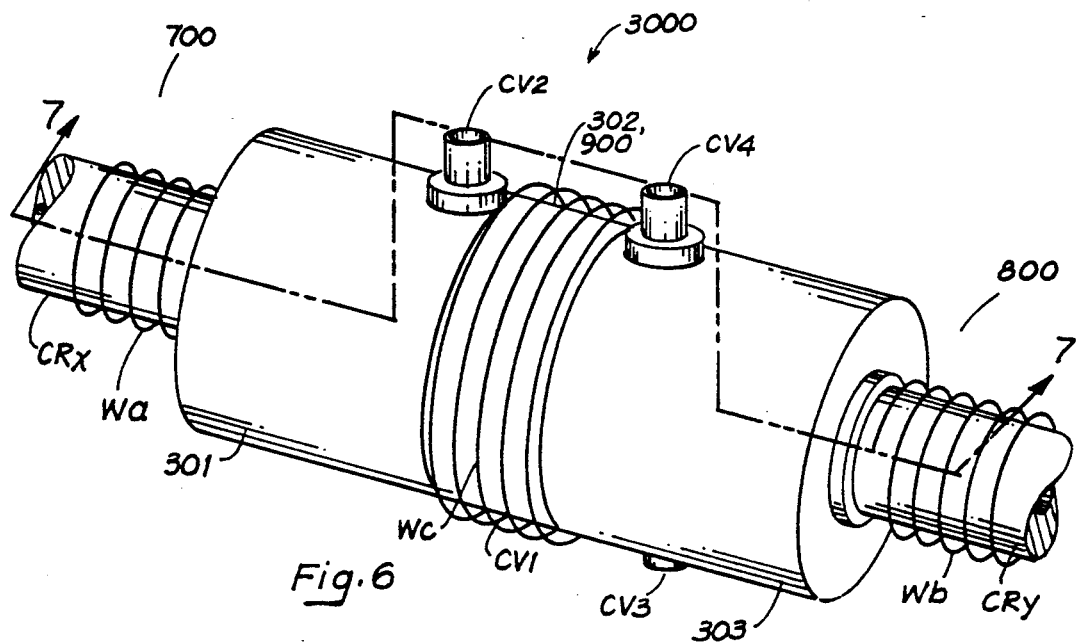
FIG. 6 is a perspective view of a third embodiment of the present invention showing a cylindrical body having electromagnets at opposing ends and a third electromagnet centrally disposed within the cylinder to complement the compression and return strokes produced by the end electromagnets.
Figure 7:
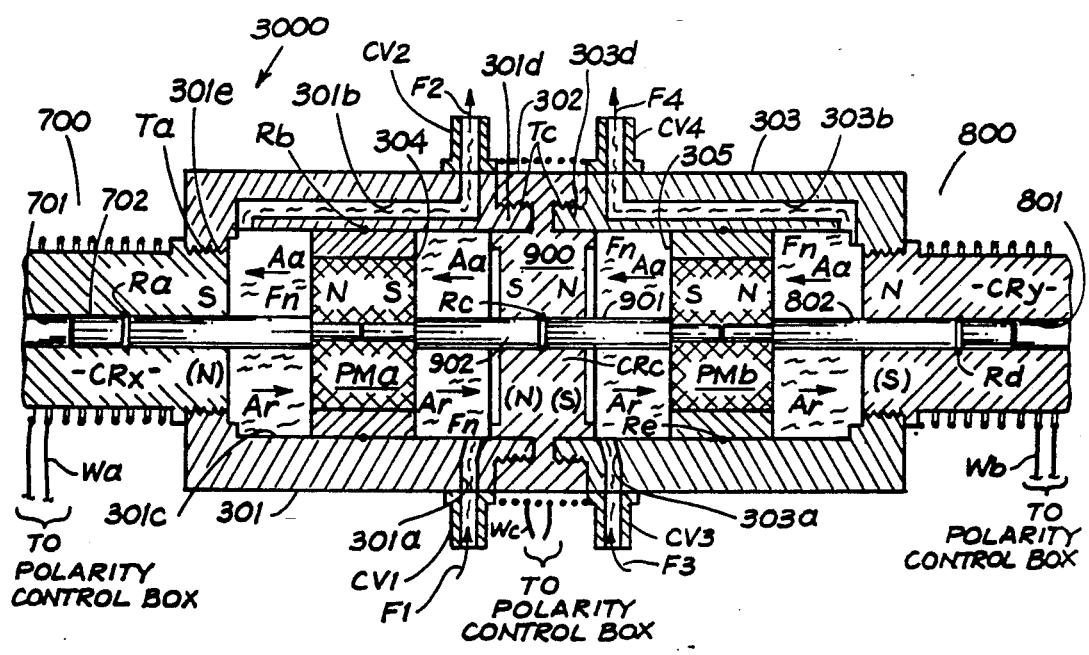
FIG. 7 is a cross-sectional view taken along line 7—7 in FIG. 6 of a third embodiment of the present invention, showing the dual piston-permanent magnet means within respective cylinder chambers and mechanically interconnected by a central non-magnetic common shaft and oppositely adjoining magnetic shafts and being magnetically coupled by the third central electromagnet for enhanced synchronized reciprocating action for receiving and delivering fluid through input/output ports during compression and return strokes.

FIGS. 6 and 7 illustrate a third embodiment 3000 comprising a cylindrical arrangement 301, 302, 303 having electromagnets 700, 800 at opposing ends and a third electromagnet 900 centrally disposed within cylinder portion 302 to complement the compression and return strokes produced by end electromagnets 700, 800. Embodiment 3000 also comprises check-valved fluid input ports CV1 and CV3 for controlling input fluid flow F1 and F3 and output ports CV2 and CV4 for controlling fluid output flow F2 and F4. FIG. 7 illustrates embodiment 3000 also having a dual piston-permanent magnet means 304, 305 within respective cylinder chambers 301c, 303c and having mechanically interconnecting, non-magnetic, common shaft 901 and oppositely adjoining magnetic shafts 702, 802. Piston-permanent magnet means 304 being magnetically coupled at one end via electromagnet 700 and at an opposite end via one end of third electromagnet 900. Similarly, piston-permanent magnet means 305 being magnetically coupled at one end via electromagnet 800 and at an opposite end via another end of third electromagnet 900. Central, non-magnetic common shaft 901 and oppositely adjoining magnetic shafts 702, 802 reciprocate within bores 701, 902, 801 and aid in maintaining synchronized reciprocating action of apparatus embodiment 3000 and further are aid to increase the magnetic influence of the electromagnets and hence the generation of higher fluid pressures. Electromagnetic means 700, 800 each comprising a stationary, centrally disposed core member CRx, CRy (including bores 701, 801), dual-winding coil members Wa, Wb and are mechanically secured to cylinder end portions 301e, 303e via a thread arrangements Ta, Tb. Central electromagnetic means 900 comprising a stationary, centrally disposed core member CRc (including bore 902 and dual-winding coil member Wc. Central electromagnet 900 and central cylinder portion 302 being joined to inner cylinder end portions 301d, 303d via thread arrangement Tc. Electromagnetic embodiments 700, 800 differ from electromagnets (EM1, EM2), (200, 300) in their magnetic characteristics relating to attraction/repulsion capabilities for reciprocating the dual piston configuration illustrated in FIG. 7. Cylinder block portions 301, 303 are provided with ports 301(a,b), 303(a,b) for the attachment of check valves CV(1-4) which control the flow of fluid Fn, initially delivered into cylinder chambers 301c, 303c during a return stroke, as indicated by fluid flow arrows F1 and F3, and which fluid Fn is expelled during a compression stroke, as indicated by fluid output flow arrows F2 and F4. Piston-permanent magnet means 304, 305 and interconnecting shafts 702, 901, 802 are designed having rings Rb, Re, Ra, Rc, and Rd, respectively, for maintaining compression. Piston-permanent magnet means 304, 305 are each provided with an embedded permanent magnet PMa, PMb, which by example, are shown polarized (north N) and (north N), respectively, at ends adjacent inner portions of core members CRx, CRy, and which polarization is understood to be an arbitrary arrangement of the embedded permanent magnets. The innermost portions of permanent magnets PMa, PMb are shown polarized (south S) and (south S), respectively, at ends adjacent opposite ends of core member CRc. Any arrangement of the permanent magnets PMa, PMb is suitable so long as the polarity of the end electromagnets 700, 800 and 900 is synchronized to repel one of the embedded permanent magnet and concurrently attract the other embedded permanent magnet.

Thus, as illustrated in FIG. 7 and assuming that pistons 304, 305 are to move in the direction of arrow Aa, then electromagnet 700 will be electrically energized to magnetically polarize core member CRx to a south (S) polarity, and concurrently, electromagnet 900 will be energized to polarize one end of core member CRc to a south S polarity while the other end will be polarized to a north N polarity, and electromagnet 800 will be electrically energized to magnetically polarize core member CRy to a north N polarity, also during the time associated with arrow Aa. Also, assuming that pistons 304, 305 have reached the end of a stroke, indicated by motion arrow Aa, then the polarity of electromagnets 700, 800 and 900 will be reversed to produce motion indicated by arrow Ar of pistons 304, 305 such that electromagnet 700 will be electrically energized to polarize core member CRx to a north (N) polarity, and concurrently, electromagnet 900 will be energized to polarize one end of core member CRc to a north (N) polarity, while the other end will be polarized to a south (S) polarity, and electromagnet 800 will be electrically energized to magnetically polarize core member CRy to a south (S) polarity, also during the time associated with arrow Ar. Repeated and controlled changes in the polarity of electromagnets 700, 800, and 900 will result in a reciprocating action for continuous pumping of fluid Fn in and out of chambers 301c, 303c. By design, cylinder chambers 301c, 303c are filled with fluid Fn via either of the input ports/check valves 301a/CV1 or 303a/CV3 during a return stroke, depending which end of cylinders 301c, 303c is in a return stroke state that creates a vacuum that draws fluid from fluid reservoir 600, see FIG. 3. Similarly, cylinders 301c, 303c are emptied under compression via either of the output ports/check valves 301b/CV2 or 303b/CV4, also depending upon which side of cylinders 301c, 303c is under compression. Fluid Fn may be any petroleum fluid product, such as those commonly used in automatic transmissions.

FIG. 5a illustrates a dc power source 400 coupled to a magnetic polarity control box 401 for changing the magnetic polarity of the electromagnets. The polarity change is facilitated by output switching means 402, 403 feeding a predetermined quantity of the electromagnets, shown generally as EMx, EMn. Polarity control box 402 can be configured to electrically couple to embodiments 10, 100 or 3000, such that the appropriate dc output polarity feeds the corresponding winding lead in the dual-windings of electromagnets EM1, EM2, 200, 300, 700, 800, and 900 to generate the desired polarity, consistent with the polarity of the embedded electromagnets that are to be attracted and repelled.

Figure 3:
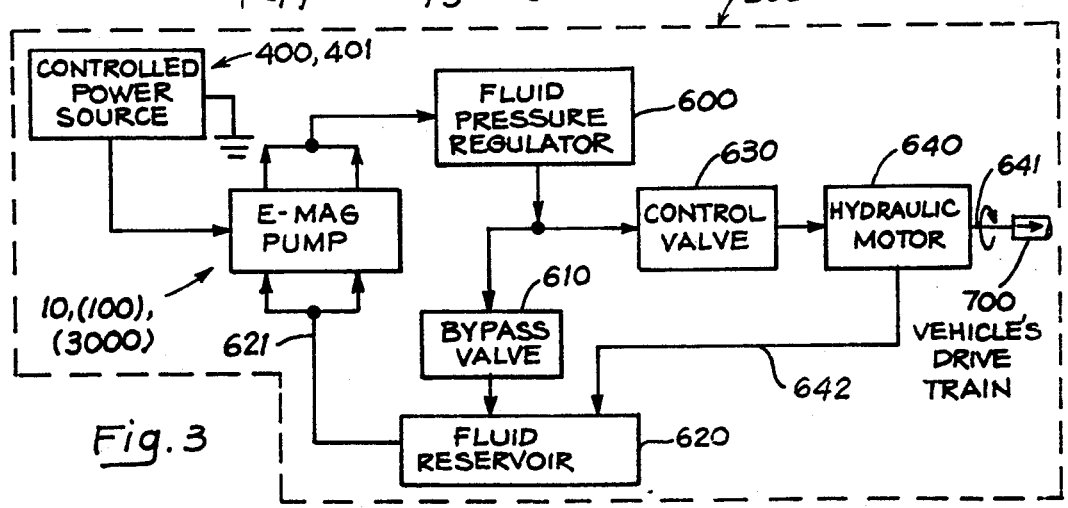
FIG. 3 is a block diagram view of a vehicular application of the present invention, illustrating the electromagnetic pump as a component of the hydraulic engine mechanically coupled to a vehicle's drivetrain.

FIG. 3 illustrates a generalized vehicular application 500 comprising controlled power source 400, 401 (see FIG. 5a), electrically coupled to an electromagnetic pump 10 (100), (3000), which pump is central to a closed-loop hydraulic drive system. The close-loop system comprises an electromagnetic pump 10, (100), (3000), a fluid pressure regulator 600, a control valve 630, a bypass valve 610, a fluid reservoir 620, and a hydraulic motor 640 which includes return line 642 feeding back to fluid reservoir 620. Motor 640 is provided with an output drive shaft 641 coupled to a vehicle's drivetrain 700 which includes propulsion components such as transmissions and wheels (not shown). In operation, power source 400, 401 provides alternating electrical energy for changing the magnetic polarities at the electromagnets EM1, EM2 (200, 300,), (700, 800, 900) to produce reciprocating motion A1, A2, (A11, A22), (Aa, Ar) which, assuming that the close-loop hydraulic system has been suitably primed, will cause pressurized fluid to flow in the system. The system is designed to maintain a high fluid pressure by virtue of fluid stabilizer 600 and can operate in an idle state by the use of bypass valve 610 which feeds fluid back to reservoir 620 and back to the E-MAG pump 10, (100), (3000) via hydraulic line 621, or be in a mechanical energy producing state by engagement of control valve 630. Engagement of control valve 630 produces rotary motion at shaft 641 for controlled engagement to drivetrain 700. Fluid used to produce the rotary motion at shaft 641 is returned back to the fluid reservoir 620 which then feeds the input ports of cylinder 51.

Therefore, while the present invention has been shown and described herein in what is believed to be the most practical and preferred embodiments, it is recognized that departures can be made therefrom within the scope of the invention. As an example, a very basic embodiment (not shown) would comprise only one electromagnetic means energized on and off in conjunction with the permanent magnet to produce the compression strokes. Therefore the invention is not to be limited to the details disclosed herein but is to be accorded the full scope of the claims so as to embrace any and all equivalent apparatus.

We claim:

1. A hydraulic engine apparatus, said apparatus comprising:
   an electrical energy source means for powering said apparatus;
   a hydraulic motor having an output drive shaft to effect conversion of electrical energy from said electrical energy source to work;
   at least one electromagnet means electrically coupled and responsive to said energy source means for producing controlled magnetic fields, said electromagnet means comprising a coil member and a fixedly and centrally located magnetic core member with respect to said coil member; and
   at least one piston-permanent magnet means disposed within a cylinder in a magnetically coupling relationship with said core member, said cylinder having suitably disposed input and output ports at each end of said cylinder for alternately receiving and delivering a fluid under pressure, said output ports being in a hydraulically coupled relationship with said hydraulic motor,
   said core member having a central bore portion, and said at least one piston-permanent magnet means further comprising an end-connected shaft member for magnetically coacting with said central bore portion and producing increased magnetic pull.

2. A hydraulic engine apparatus as recited in claim 1, wherein:
   said energy source means comprises a controlled on/off energy source circuit for producing a magnetic field that polarizes a first end of said core member at a polarity that is the same as a permanent polarity on a permanent magnet member of said at least one piston-permanent magnet means such that a repelling force is generated during an on-state of said controlled on/off energy source;

said first end of said core member being magnetically neutralized during an off-state of said controlled on/off energy source to facilitate said piston-permanent magnet means being attracted towards said first end of said core member; and said controlled on/off energy source means being synchronized to produce alternating on/off energization states to produce reciprocating action by said piston-permanent magnet means that facilitates said receiving and delivering of fluid under pressure.

3. A hydraulic engine apparatus as recited in claim 1, wherein:

said at least one electromagnet means comprises a first and second electromagnet means, each electromagnet means being arranged in mechanical alignment at opposite ends of said cylinder, each respective core member of said first and second electromagnetic means having a respective one of said central bore portion, and said at least one permanent-magnet means having a respective one of said end-connected shaft member disposed at each end for coacting with a respective one of said central bore portion for increasing magnetic pull, each of said first and second electromagnet means having a coil member comprised of at least one winding for alternately receiving electrical energy from said energy source for producing a predetermined first and second magnetic polarity on a respective core member to facilitate reciprocating movement of said piston-permanent magnet means.

4. A hydraulic engine apparatus as recited in claim 1, wherein:

said cylinder and piston-permanent magnet means comprises a bank of at least two similar ones of said cylinder and piston-permanent magnet means, said at least two similar ones of said cylinder and piston-permanent magnet means being space apart by a mechanical interface that couples one cylinder and piston-permanent magnet means to the other cylinder and piston-permanent magnet means, said mechanical interface including a movable, non-magnetic shaft connecting one piston-permanent magnet means with the other piston-permanent magnet means to form a shaft-connected piston-permanent magnet means to effect synchronized reciprocating action of both piston-permanent magnet means; and said at least one electromagnet means comprises a first and second electromagnet means, each electromagnet means being arranged in mechanical alignment at opposite ends of said bank, each respective core member of said first and second electromagnetic means having a respective one of said central bore portion, and each permanent-magnet means having a respective one of said end-connected shaft member disposed at an outermost end for coacting with a respective one of said central bore portion for increasing magnetic pull, each of said first and second electromagnet means having a coil member comprised of at least one winding for alternately receiving electrical energy from said energy source for producing a predetermined first and second magnetic polarity on a respective core member to facilitate reciprocating movement of said shaft-connected piston-permanent magnet means.

5. A hydraulic engine apparatus as recited in claim 1, wherein said apparatus further comprises:

a pressure stabilizer means for maintaining a fluid pressure to effect uniform operation of said hydraulic motor; and said input and output ports each having a check valve means for controlling flow of said fluid.

6. A hydraulic engine apparatus as recited in clam 5, wherein said apparatus further comprises:

a hydraulic valve coupled to said stabilizer means for directing said fluid to said hydraulic motor;

a bypass hydraulic valve also coupled to said stabilizer means for effecting an idle state operation of said engine apparatus; and a fluid reservoir hydraulically coupled to each of said input ports and to said bypass hydraulic valve and said hydraulic motor.

7. A hydraulic engine apparatus as recited in claim 1, wherein:

said cylinder and piston-permanent magnet means comprises a bank of at least two similar ones of said cylinder and piston-permanent magnet means, said at least two similar ones of said cylinder and piston-permanent magnet means being spaced apart by a mechanical interface that couples one cylinder and piston-permanent magnet means to the other cylinder and piston-permanent magnet means, said mechanical interface including a movable, non-magnetic shaft connecting one piston-permanent magnet means with the other piston-permanent magnet means to form a shaft-connected piston-permanent magnet means to effect synchronized reciprocating action of both piston-permanent magnet means; and said at least one electromagnet means comprises a first, second and third electromagnet means, said first and second electromagnet means being arranged in mechanical alignment at opposite ends of said bank, said third electromagnet means being arranged within said mechanical interface, each respective core member of said first and second electromagnetic means having a respective one of said central bore portion and each permanent-magnet means having a respective one of said end-connected shaft member disposed at an outermost end for coacting with a respective one of said central bore portion for increasing magnetic pull, each of said first, second, and third electromagnet means having a coil member comprised of at least one winding for alternately receiving electrical energy from said energy source for producing a predetermined first and second magnetic polarity on a respective core member to facilitate reciprocating movement of said shaft-connected piston-permanent magnet means.

8. A vehicular apparatus having a drivetrain, axle and wheels for effecting propulsion, said apparatus comprising:

an electrical energy source means for powering said apparatus;

a hydraulic motor having an output drive shaft coupled to said drivetrain to produce propulsion;

at least one electromagnet means electrically coupled and responsive to said energy source means for producing controlled magnetic fields, said electromagnet means comprising a coil member and a fixedly and centrally located magnetic core member with respect to said coil member; and at least one piston-permanent magnet means disposed within a cylinder in a magnetically coupling relationship with said core member, said cylinder having suitably disposed input and output ports at each end of said cylinder for alternately receiving and delivering a fluid under pressure, said output port being in a hydraulically coupled relationship with said hydraulic motor, said cylinder and said at least one piston-permanent magnet means being a bank of at least two similar ones of said cylinder and said at least one piston-permanent magnet means, said at least two similar ones of said cylinder and said at least one piston-permanent magnet means being spaced apart by a mechanical interface that couples one cylinder and piston-permanent magnet means to the other cylinder and piston-permanent magnet means, said mechanical interface including a movable, non-magnetic shaft connecting one piston-permanent magnet means with the other piston-permanent magnet means to form a shaft-connected piston-permanent magnet means to effect synchronized reciprocating action of both piston-permanent magnet means; and said at least one electromagnet means comprises a first, second and third electromagnet means, said first and second electromagnet means being arranged in mechanical alignment at opposite ends of said bank, said third electromagnet means being arranged within said mechanical interface, each of said first, second, and third electromagnet means having a coil member comprised of at least one winding for alternately receiving electrical energy from said energy source for producing a predetermined first and second magnetic polarity on a respective core member to facilitate reciprocating movement of said shaft-connected piston-permanent magnet means.

9. A hydraulic pump apparatus, said apparatus comprising:

an electrical energy source means for powering said apparatus;

at least one electromagnet means electrically coupled and responsive to said energy source means for producing controlled magnetic fields, said electromagnet means comprising a coil member and a fixedly and centrally located magnetic core member with respect to said coil member; and at least one piston-permanent magnet means disposed within a cylinder in a magnetically coupling relationship with said core member, said cylinder having suitably disposed input and output ports at each end of said cylinder for alternately receiving and delivering a fluid under pressure, said core member having a central bore portion, and said at least one piston-permanent magnet means further comprising an end-connected shaft member for magnetically coacting with said central bore portion and producing increased magnetic pull.

10. A hydraulic pump apparatus as recited in claim 9, wherein:

said cylinder and piston-permanent magnet means comprises a bank of at least two similar ones of said cylinder and piston-permanent magnet means, said at least two similar ones of said cylinder and piston-permanent magnet means being spaced apart by a mechanical interface that couples one cylinder and piston-permanent magnet means to the other cylinder and piston-permanent magnet means, said mechanical interface including a movable, non-magnetic shaft connecting one piston-permanent magnet means with the other piston-permanent magnet means to form a shaft-connected piston-permanent magnet means to effect synchronized reciprocating action of both piston-permanent magnet means; and said at least one electromagnet means comprises a first, second and third electromagnet means, said first and second electromagnet means being arranged in mechanical alignment at opposite ends of said bank, each respective core member of said first and second electromagnetic means having a respective one of said central bore portion and each permanent-magnet means having a respective one of said end-connected shaft member disposed at an outermost end for coacting with a respective one of said central bore portion for increasing magnetic pull, said third electromagnet means being arranged within said mechanical interface, each of said first, second, and third electromagnet means having a coil member comprised of at least one winding for alternately receiving electrical energy from said energy source for producing a predetermined first and second magnetic polarity on a respective core member to facilitate reciprocating movement of said shaft-connected piston-permanent magnet means.

11. A method of producing propulsion using hydraulic means, said method comprising the steps of:

(a) providing an engine apparatus, said engine apparatus comprising:

an electrical energy source means for powering said apparatus, a hydraulic motor having an output drive shaft, at least one electromagnet means electrically coupled and responsive to said energy source means for producing controlled magnetic fields, said electromagnet means comprising a coil member and a fixedly and centrally located magnetic core member with respect to said coil member, and at least one piston-permanent magnet means disposed within a cylinder in a magnetically coupling relationship with said core member, said cylinder having suitably disposed input and output ports at each end of said cylinder for alternately receiving and delivering a fluid under pressure, said output ports being in a hydraulically coupled relationship with said hydraulic motor, said core member having a central bore portion, and said at least one piston-permanent magnet means further comprising an end-connected shaft member for magnetically coacting with said central bore portion and producing increased magnetic pull;

(b) providing a fluid source, said fluid source being hydraulically coupled to said input ports of said cylinder;

(c) coupling said output driveshaft to a drivetrain of a vehicle;

(d) synchronously energizing and de-energizing said coil member from said energy source means and producing power states that result in producing alternating polarity magnetic fields;

(e) repelling said piston-permanent magnet means during a first polarity state;

(f) receiving fluid from said fluid source through one of said input ports into a vacant chamber portion of said cylinder and concurrently pumping fluid from a previously filled chamber portion of said cylinder through one of said output ports during said repelling step;

(g) attracting said piston-permanent magnet means to said core member during a second polarity state;

(h) increasing the magnetic influence of said at least one electromagnet means on said piston-permanent magnet means by further attracting said end-connected shaft member into said central bore portion to produce enhanced fluid pressures;

(i) receiving fluid from said fluid source through another one of said input port into a step (f) vacated chamber portion and pumping fluid from a step (f) filled chamber portion through another one of said output ports during said attracting steps g and h;

(j) repeating said steps (e), (f), (g), (h) and (i) and producing reciprocating action of said piston-permanent magnet means and corresponding repeated pumping of said fluid; and (k) hydraulically driving said hydraulic motor and turning said output drive shaft coupled to said drivetrain to produce propulsion of said vehicle.

12. A method of producing propulsion as recited in claim 11, wherein:

said step (a) of providing an engine apparatus further comprises providing a bypass hydraulic valve for effecting an idle state operation of said engine apparatus; and said step (k) is replaced by an alternate step (l) of producing an idle state of operation of said apparatus by continuously pumping fluid through said bypass valve.

13. A hydraulic engine apparatus, said apparatus comprising:

an electrical energy source means for powering said apparatus;

a first, second and third electromagnetic means electrically coupled and responsive to said energy source means for producing controlled magnetic fields;

at least one shaft-connected piston-permanent magnet means co-acting with said first, second, and third electromagnetic means for producing synchronized reciprocating action and delivering a fluid, said at least one shaft-connected piston-permanent magnet means being disposed within a ported enclosure; and a hydraulic motor hydraulically coupled to said enclosure, said hydraulic motor having an output drive shaft to effect conversion of electrical energy from said electrical energy source to work.

* * * * *